E. J. HORNER.

Assignor to C. SCOTT and G. F. GODLEY.

CAR-SPRING.

No. 7,536. Reissued Feb. 27, 1877.

Witnesses:

P. C. Dieterich

Frank H. Waffy

E. J. Horner Inventor:

Per, Lloyd & Mason Attorneys.

N. PETERS, PHOTO-LITHOGRAPHER, WASHINGTON, D. C.

UNITED STATES PATENT OFFICE.

EDWIN J. HORNER, OF WILMINGTON, DELAWARE, ASSIGNOR TO CHARLES SCOTT AND GEORGE F. GODLEY.

IMPROVEMENT IN CAR-SPRINGS.

Specification forming part of Letters Patent No. 83,855, dated November 10, 1868; reissue No. 7,536, dated February 27, 1877; application filed February 13, 1877.

*To all whom it may concern:*

Be it known that I, EDWIN J. HORNER, of the city of Wilmington, in the county of New Castle, and in the State of Delaware, have invented certain new and useful Improvements in Car-Springs; and do hereby declare that the following is a full, clear, and exact description thereof, reference being had to the accompanying drawing and letters of reference marked thereon.

The nature of my invention consists in the arrangement of spiral springs of different sizes and strength placed inside of each other, and all of them in a box, on the top of which the cross-beam rests.

The length of the spiral springs in each set is such that each shorter spring receives the load successively after the longer spring or springs have undergone compression, thus graduating the resistance of the spring to light and heavy loads.

In order to enable others skilled in the art to which my invention appertains to make and use the same, I will now proceed to describe its construction and operation, referring to the annexed drawing, which is a part of this specification, and in which—

Figure 1:
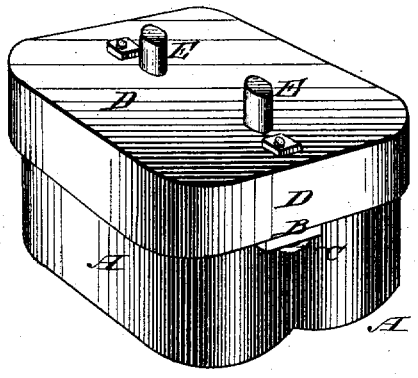
Figure 2:
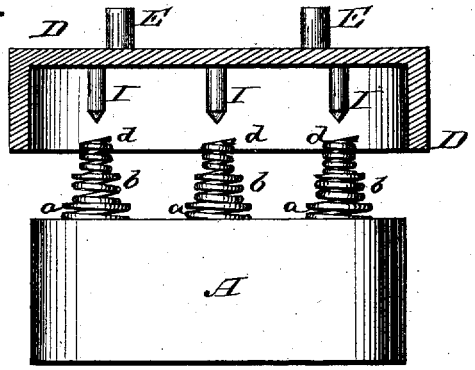
Figure 3:
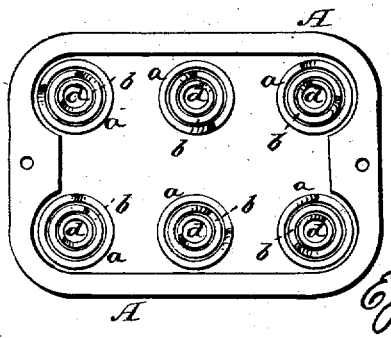

Figure 1 is a perspective view; Fig. 2, a side elevation, in section, with the lid of the box raised; and Fig. 3, a plan view with the lid removed.

A represents a box, of cast-iron, which is indented at the ends, and these indentations at the upper edge are provided with a block or flange, B, through which a screw-bolt, C, passes to secure the lid or cover D. This lid D fits around the box A, and is provided on its top with two upright pins, E E, which are intended to fit into holes on the under side of the cross-beam of the car, so as to secure the same.

It is evident that the box and lid may be of any shape and dimension desired.

Inside of this box I place a number of spiral springs, *a a*, and within each one of these another spiral spring, *b*. This latter spring *b*, to be placed inside of the former, must, of course, be smaller — that is, the coils are smaller, but should extend above the spring *a*. Inside of the spring *b* is still another and smaller spring, *d*, which extends above the spring *b*.

It will be seen that when weight is put on the car the springs *d d* will first be pressed down before the springs *b b* are touched. These, in turn, will be pressed down before the springs *a a* receive the weight, thus making a gradual sagging down of the car.

On the under side of the lid D is a number of pins, I I, which fit inside of the springs *d d*, to hold them in proper position.

I am fully aware that a coil-spring for cars is not new; also, that a series of helical springs arranged in concentric form is not new, nor their application to car-springs.

What I claim is—

A graduated car-spring, consisting of two or more spiral springs of unequal diameter, and of unequal height relatively to their bearings, combined with supports or plates to receive the load, the arrangement of springs being such that each receives the load in succession and graduates the force to sustain light and heavy loads, as set forth.

E. J. HORNER.

Witnesses:

JOHN BARR,

JAMES W. BARR.